United States Patent
Cazan et al.

(10) Patent No.: US 11,727,112 B2
(45) Date of Patent: Aug. 15, 2023

(54) BYTE N-GRAM EMBEDDING MODEL

(71) Applicant: Crowdstrike, Inc., Irvine, CA (US)

(72) Inventors: Radu Cazan, Iasi (RO); Daniel Radu, Bucharest (RO); Marian Radu, Bucharest (RO)

(73) Assignee: CrowdStrike, Inc., Irvine, CA (US)

(*) Notice: Subject to any disclaimer, the term of this patent is extended or adjusted under 35 U.S.C. 154(b) by 1264 days.

(21) Appl. No.: 16/237,468

(22) Filed: Dec. 31, 2018

(65) Prior Publication Data

US 2020/0005082 A1 Jan. 2, 2020

Related U.S. Application Data (60) Provisional application No. 62/692,331, filed on Jun. 29, 2018.

(51) Int. Cl.
| | |
|---|---|
| *G06F 21/55* | (2013.01) |
| *G06N 3/08* | (2023.01) |
| *G06F 18/214* | (2023.01) |
| *G06F 21/56* | (2013.01) |

(52) U.S. Cl.
CPC ............ *G06F 21/56* (2013.01); *G06F 18/214* (2023.01); *G06F 21/552* (2013.01); *G06N 3/08* (2013.01)

(58) Field of Classification Search
CPC ....... G06K 9/6256; G06F 21/552; G06N 3/08
See application file for complete search history.

(56) References Cited

U.S. PATENT DOCUMENTS

| | | | | |
|---|---|---|---|---|
| 9,843,596 | B1* | 12/2017 | Averbuch | G06F 21/554 |
| 9,864,956 | B1* | 1/2018 | Sai | G06N 3/02 |
| 10,055,582 | B1* | 8/2018 | Weaver | G06F 21/562 |
| 10,169,715 | B2* | 1/2019 | Dirac | G06N 20/00 |
| 10,305,923 | B2* | 5/2019 | McLane | G06N 20/20 |
| 2010/0153420 | A1* | 6/2010 | Yang | G06F 16/90344 707/758 |
| 2018/0032729 | A1* | 2/2018 | Zhang | G11C 15/00 |
| 2019/0007434 | A1* | 1/2019 | McLane | G06F 21/55 |
| 2019/0213328 | A1* | 7/2019 | Yahalom | G06F 18/24 |
| 2019/0294452 | A1* | 9/2019 | Herring, Jr. | G06F 3/0482 |
| 2020/0005082 | A1* | 1/2020 | Cazan | G06F 18/22 |

OTHER PUBLICATIONS

Extended European Search Report dated Nov. 20, 2019 for European Patent Application No. 19177731.7, 10 pages.

(Continued)

*Primary Examiner* — Viral S Lakhia
(74) *Attorney, Agent, or Firm* — Lee & Hayes, P.C.

(57) ABSTRACT

Training and use of a byte n-gram embedding model is described herein. A neural network is trained to determine a probability of occurrence associated with a byte n-gram. The neural network includes one or more embedding model layers, at least one of which is configured to output an embedding array of values. The byte n-gram embedding model may be used to generate a hash of received data, to classify the received data with no knowledge of a data structure associated with the received data, to compare the received data to files having a known classification, and/or to generate a signature for the received data.

19 Claims, 7 Drawing Sheets

(56) References Cited

OTHER PUBLICATIONS

Raff, et al., "An Investigation of Byte N-Gram Features for Malware Classification", Springer-Verlag France; Mar. 30, 2016; 20 pages.
Raff, et al., "Malware Detection by Eating a Whole EXE", University of Maryland, Oct. 25, 2017; 13 pages.
Sun et al, "Learning Fast and Slow: Propedeutica for Real-Time Malware Detection", arxic.org, Cornell University Library, Ithaca, NY, Dec. 4, 2017, 17 pages.

* cited by examiner

BYTE N-GRAM EMBEDDING MODEL

This patent application claims priority to U.S. Provisional Application No. 62/692,331 titled "BYTE N-GRAM EMBEDDING MODEL," filed on Jun. 29, 2018, commonly assigned herewith, and hereby incorporated by reference.

BACKGROUND

There are many reasons for comparing digital files, such as executable programs, libraries, photos, documents, and so on. For example, if a particular file is known to contain a virus or to be malware, it is desirable to be able to compare a new file that is received to the particular file to determine whether or not the new file is likely to contain a virus or to be malware. In many existing techniques, features are extracted from files, for example, based on file format parsing, and the features are typically compared after one-hot encoding. One-hot encoding refers to the technique where a categorical feature is transformed into multiple true/false features indicating the presence or the absence of a particular categorical value.

While such tools can detect files that are very similar to known virus or malware files, a malicious entity may modify a file sufficiently to avoid similarity detection, for example, by modifying a structure of the file. This can lead to a failure to detect malicious files.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes a byte n-gram embedding model and applications thereof. Each byte n-gram is a series of n bytes that occur in sequence within a particular set of binary data. For example byte 4-grams extracted from a binary file may include a first 4-gram including the first four bytes (i.e., bytes 1, 2, 3, and 4) from the file, a second 4-gram including bytes 2, 3, 4, and 5 from the file, a third 4-gram including bytes 3, 4, 5, and 6 from the file, and so on. An embedding is created over binary data, in some examples without knowledge of file structure or file type ("structure-agnostic"). Using a set of training data, a neural network is trained, with the target being the probability of occurrence of any particular byte n-gram. Once trained, the embedding model may be used to generate a hash of the binary data, to classify a file or other binary data (e.g., as malware, adware, clean, or some other class), or to generate a signature for the binary data.

Because the byte n-gram embedding model is structure-agnostic, classification can be performed as files are being downloaded, without requiring that the entire file be downloaded before the classification can begin. For example, as a file is downloaded, the data that is received can be processed, and a classification can be processed. The classification can be repeated as additional data is received. In this way, it may be possible to identify malware as it is being downloaded, and before it is fully downloaded, providing additional system security.

Similarly, because the byte n-gram embedding model is structure-agnostic, feature extraction can be performed as a file is being downloaded, and can be split across multiple processors or machines in parallel, decreasing the processing time.

Illustrative Training of an Example Byte N-Gram Embedding Model

Figure 1:
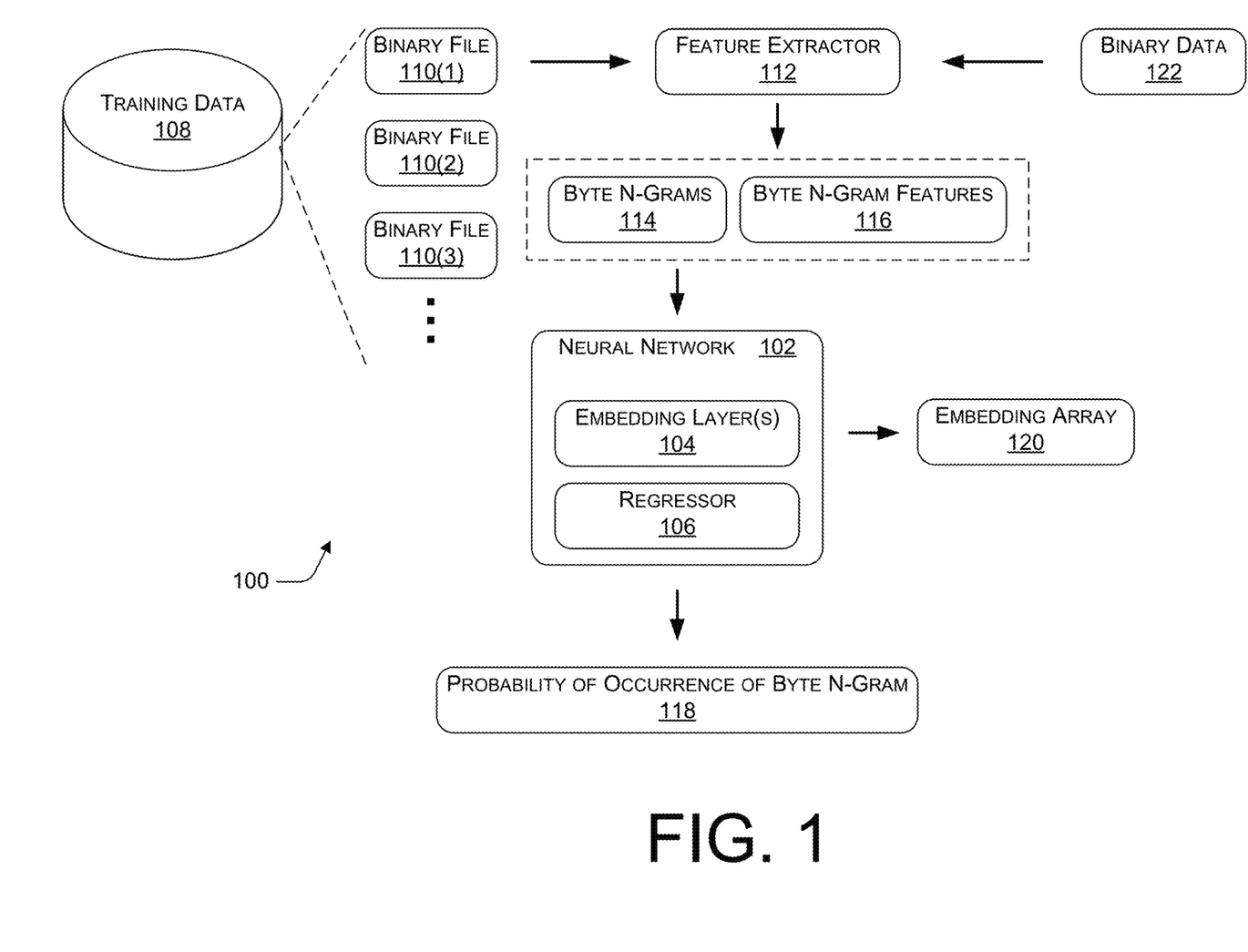
FIG. 1 is a block diagram illustrating an example environment in which an example byte n-gram embedding model may be trained and used.

FIG. 1 illustrates an example environment 100 in which an example byte n-gram embedding model may be trained and used. A neural network 102 includes one or more embedding layers 104 and a regressor 106. Training data 108 includes any number of binary files, such as binary file 110(1), 110(2), 110(3), and so on. The training data 108 is provided to a feature extractor 112, which extracts byte n-grams 114 and features 116 of the byte n-grams from the binary files 110 (see, for example, FIG. 2). The byte n-gram features 116 are provided to the neural network 102, and the regressor 106 trains the neural network 102 to determine, for each byte n-gram within the training data 108, a probability of occurrence 118 of the byte n-gram. The regressor 106 trains the neural network 102 to output, from an embedding layer 104, for each byte n-gram within the training data 108, an embedding array 120.

Once the neural network 102 is trained, binary data 122 may be provided as input to the feature extractor 112, and the extracted features may be provided to the neural network 102. The neural network 102 may provide, as output, a probability of occurrence 118 of each byte n-gram extracted from the binary data 122. The neural network 102 may also, or alternatively, provide, as output from one of the embedding layers 104, an embedding array 120.

Analysis of a large set of training data (over one billion files) has shown that the natural occurrence probability of individual byte 4-grams has a distribution pattern that is similar to Benford's law, with some byte 4-grams occurring much more frequently than other byte 4-grams. For example, byte 4-grams ending in "F" occur more frequently than other 4-grams. Accordingly, files that include 4-grams that are less likely to occur, are more suspicious than files that contain only commonly occurring 4-grams.

Figure 2:
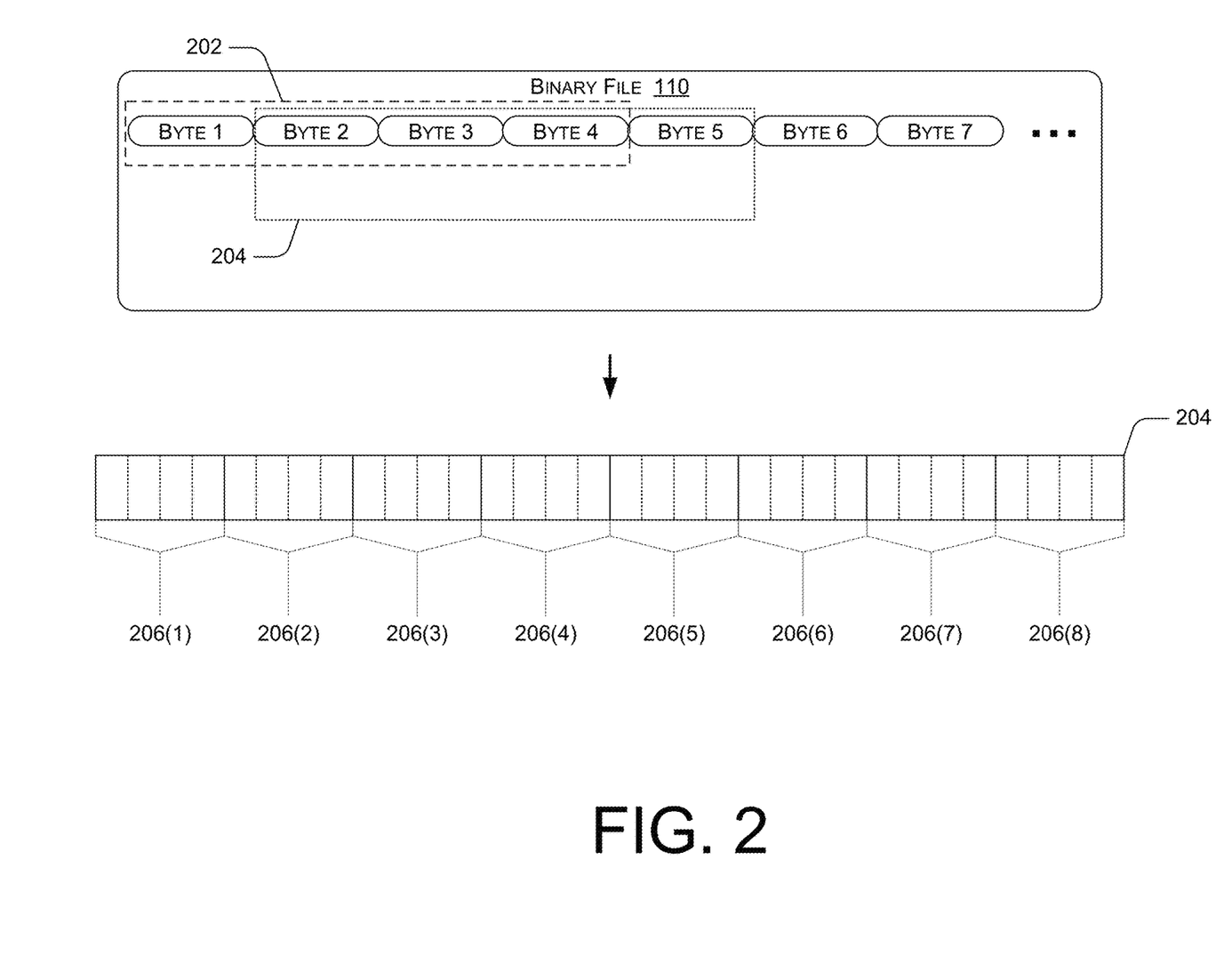
FIG. 2 is a block diagram illustrating example features that may be used to train the neural network.

FIG. 2 illustrates example features that may be used to train the neural network. As illustrated in FIG. 1, training data 108 includes a plurality of binary files 110, which may include any combination of clean files, known malware, known adware, and so on. Each binary file 110 may include any number of bytes, which may be combined to form byte n-grams. In an example implementation, for each binary file 110, byte n-grams are extracted from the file, using a 1-byte sliding window. For example, for a byte 4-gram model, the first 4-gram consists of bytes one through four, the second 4-gram consists of bytes two through five, the third 4-gram consists of bytes three through six, and so on. This is illustrated in FIG. 2, in which a first byte 4-gram 202 includes byte 1, byte 2, byte 3, and byte 4. Using a 1-byte sliding window, a second byte 4-gram 204 includes byte 2, byte 3, byte 4, and byte 5. Accordingly, if a file has x bytes, (x−3) byte 4-grams may be extracted from the file using the 1-byte sliding window.

In an example implementation, each byte 4-gram is represented as eight nibbles, where each nibble is four bits. As illustrated in FIG. 2, byte 4-gram 204 includes 32 bits, which can also be represented as eight nibbles 206(1)-206(8). Each nibble may be represented as a single hexadecimal digit (0-F) or as an integer between 0 and 15. In this example, when training neural network 102, the input to the neural network 102 is, for each byte 4-gram, the eight nibbles thereof. The training target is the number of files (or representation thereof, e.g., logarithm or scaled logarithm thereof) in which the byte 4-gram appears. In other words, the neural network is trained to predict a natural occurrence probability of a byte 4-gram using the nibbles of the byte 4-gram as features. Alternative implementations may utilize different features extracted from each byte n-gram. For example, the byte n-gram itself may be used as a feature, each byte may be used as a feature, at least one pair of bits from the byte n-gram may be used as a feature, asymmetrical nibbles may be used as features (e.g., a byte may be split into a 6-bit nibble and a 2-bit nibble), and so on. In some examples, any value of n greater than or equal to one may be used for the n-gram size.

Illustrative Classification of Data Using a Byte N-Gram Embedding Model

Referring back to FIG. 1, in an example implementation, the neural network 102 includes multiple embedding layers 104, with the final layer outputting a single value 118 representing the probability of occurrence of an input byte n-gram. To facilitate file comparisons or analysis based on the byte n-gram embedding model, output from a previous layer of the neural network 102 is used. In an example implementation, the neural network 102 includes two embedding layers 104 prior to the final output layer, each of the embedding layers producing an array of 64 output values. Any number of layers of embedding may be implemented with any number of values in each layer. In an example implementation, the neural network 102 is configured to output an array of the last 64 values before the final layer. In alternate implementations, the output array may include any number of values greater than one.

Figure 3:
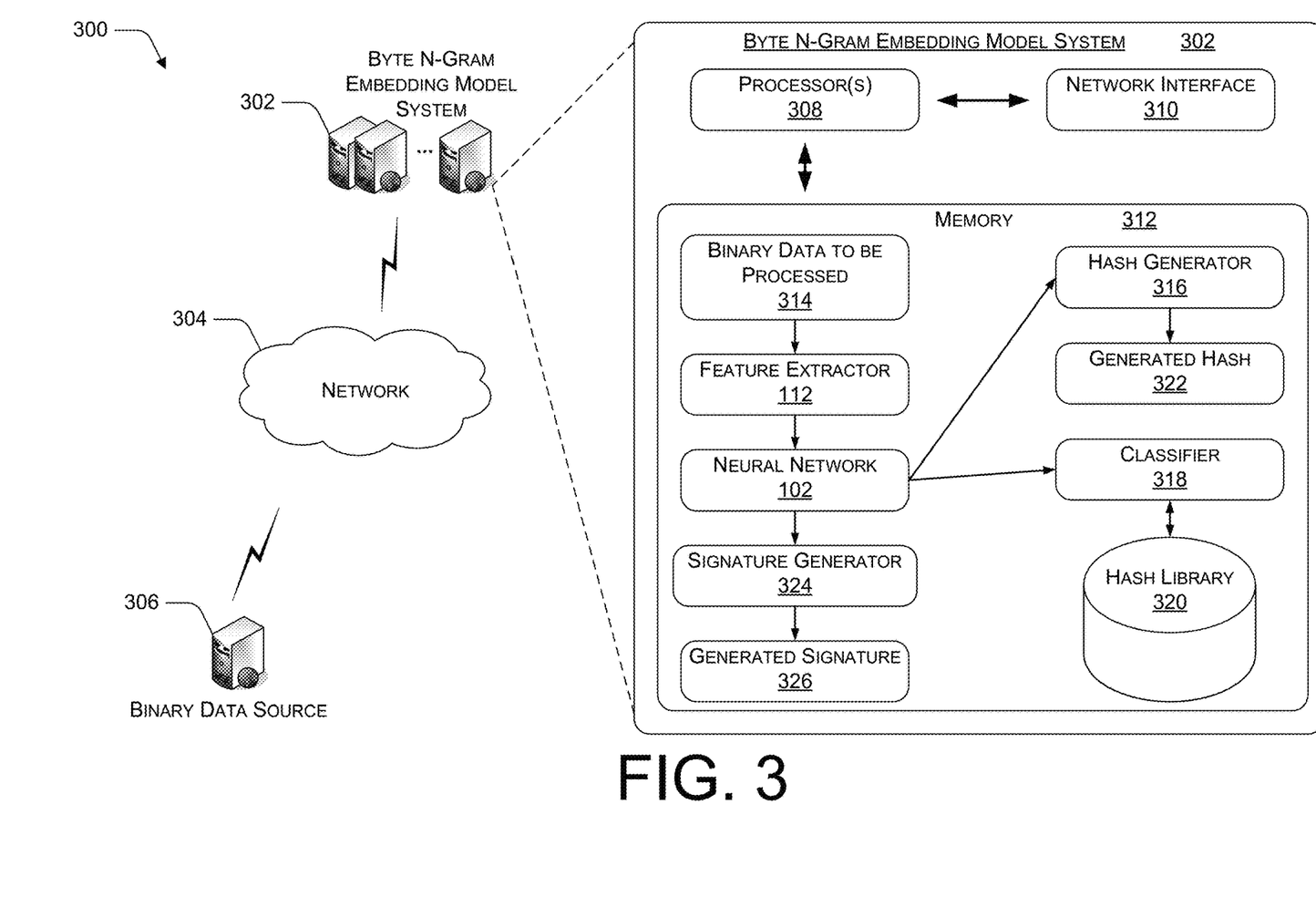
FIG. 3 is a block diagram illustrating portions of an example system configured to classify binary data, and related components.

A secure fuzzy hashing algorithm is used to enable comparison between two or more binary datasets (e.g., binary files, binary data currently being downloaded, network traffic, etc.). FIG. 3 illustrates select components of an example system 300 configured to compare a received binary file to a known malware file, in order to classify the received file as malware or clean. The example system 300 includes a byte n-gram embedding model system 302, a network 304, and a binary data source 306. Byte n-gram embedding model system 302 includes one or more processors 308, a network interface 310, and memory 312. Binary data to be processed 314, feature extractor 112, trained neural network 102, a hash generator 316, a classifier 318, and a hash library 320 are maintained in the memory 312. Memory 312 may also store a generated hash 322.

The binary data to be processed 314 may be local to the byte n-gram embedding model system 302 or may be received from a binary data source 306, for example, via a network 304. The binary data to be processed 314 may be a complete binary file or may be a partial file or stream of binary data, for example, that is currently being received via the network 304. The binary data to be processed 314 may correspond to binary data 122 in FIG. 1.

Feature extractor 112 is configured to extract from the binary data to be classified, features for processing by the neural network 102. For example, as described above with reference to FIG. 2, feature extractor 112 may be configured to extract a plurality of byte n-grams from the binary data to be processed 314. From each byte n-gram, feature extractor 112 may further extract additional features, such as 4-bit nibbles.

The features extracted from the binary data to be classified are then sent to the neural network 102 for processing. As described above with reference to FIG. 1, in the described example implementation, the neural network 102 is configured to determine a probability of occurrence associated with the byte n-gram. The neural network may include, for example, any number of intermediate layers. In the example implementation, the neural network outputs, for each byte n-gram, an embedding of the byte n-gram as an array of values 120 from an intermediate layer of the neural network. In the example implementation described herein, each byte n-gram is a byte 4-gram, and the output from the neural network is an array of 64 values, although it is recognized that a byte n-gram may include any number of bytes and the neural network output may be an array of any number of values.

Hash generator 316 receives the arrays output from the neural network 102, one array per byte n-gram. Hash generator 316 analyzes the arrays to select a plurality of byte n-gams to be used to generate a secure hash of the binary data to be classified. In some examples, the secure hash has a fixed size that is based on the output from the neural network. In the described example implementation, the hash generator 316 determines, for each position in the array structure (e.g., positions 0-63 of a zero-indexed 64-element array), a numerically minimum value and a numerically maximum value over the arrays received (signed or unsigned comparisons can be used). The hash generator 316 then identifies, for each position in the array structure, the byte n-gram that resulted in the minimum value and the byte n-gram that resulted in the maximum value. The hash generator then concatenates the identified byte n-grams according to a predetermined ordering, generating a hash 322 of the binary data to be processed 314. In some examples, the ordering specifies that hash 322 include the n-grams associated with the 64 minimum values followed by the n-grams associated with the 64 maximum values, in that order. In other examples, the ordering specifies that hash 322 include the n-gram associated with the minimum value for position 0, the n-gram associated with the maximum value for position 0, the n-gram associated with the minimum value for position 1, . . . the n-gram associated with the maximum value for position 63, in that order.

As a simple example, assuming a file 110 includes seven bytes, which are extracted as four byte 4-grams (e.g., A: bytes 1-4, B: bytes 2-5, C: bytes 3-6, and D: bytes 4-7). When the neural network processes the byte 4-grams (or features thereof), the resulting output is an array of values. For this example, assume the neural network output a 3×3 array for each byte 4-gram that is processed. For this example, assume the following arrays are output for the byte 4-grams A-D, respectively:

$$A: \begin{bmatrix} 1 & 6 & 5 \\ 13 & 9 & 8 \\ 10 & 4 & 7 \end{bmatrix} B: \begin{bmatrix} 2 & 16 & 7 \\ 8 & 3 & 45 \\ 6 & 3 & 1 \end{bmatrix}$$

$$C: \begin{bmatrix} 5 & 8 & 9 \\ 23 & 12 & 6 \\ 9 & 2 & 17 \end{bmatrix} D: \begin{bmatrix} 8 & 26 & 3 \\ 7 & 7 & 13 \\ 3 & 8 & 6 \end{bmatrix}$$

Based on the output arrays above, an array of minimum and maximum values (and the corresponding n-grams) can be expressed as:

$$\begin{bmatrix} 1(A)8(D) & 6(A)26(D) & 3(D)9(C) \\ 7(D)23(C) & 3(B)12(C) & 6(C)45(B) \\ 3(D)10(A) & 2(C)8(D) & 1(B)17(C) \end{bmatrix}$$

Accordingly, a hash of the file can be created by concatenating the byte n-grams as follows:
ADADDCDCBCCBDACDBC
This example is provided as a simplistic illustration of one example technique for construction the hash described herein.

In the described example implementation, the hash generator 316 creates a hash that includes the byte 4-grams that result in the maximum and minimum values for each position in the array of 64 values. Accordingly, in this example, a hash generated by the hash generator will include 128 byte 4-grams, and will thus be 512 bytes, or 1024 characters (nibbles), long. A single byte 4-gram may be represented multiple times in the hash, for example, if the same byte 4-gram results in multiple maximum values, multiple minimum values, or at least one maximum value and at least one minimum value. In alternative implementations, any other statistical function or mathematical operation may be used to select the byte n-grams that are included in the hash. Because the hash is generated based on the byte n-gram embedding model, the hash cannot be generated without the byte n-gram embedding model. Furthermore, two hashes cannot be compared without access to the byte n-gram embedding model. Accordingly, the generated hash is a secure hash. For example, even if a binary file is small enough that every byte n-gram therein is included in the hash, the order of the byte n-grams in the file cannot be determined from the hash.

The hash library 320 includes a hash value, generated by the hash generator 316, for each of any number of files known to be malicious (e.g., malware, virus, etc.) and/or any number of files known to be clean.

The classifier 318 may be configured to identify files that are similar to a reference file and/or to classify a file as clean, malicious, adware, malware, or any other class. In an example implementation, the classifier 318 is configured to compare the generated hash 322 representing the binary data to be processed 314 to a previously generated reference hash value stored in the hash library 320. In an example implementation, a dot product is calculated between the embedding arrays associated with the byte n-grams in the generated hash 322 and embedding arrays associated with the byte n-grams in a previously generated hash value stored in the hash library 320, resulting in a similarity score between zero and one, where a larger similarity score represents greater similarity between the files. A pre-defined similarity threshold may be used to determine whether the calculated similarity score indicates that the binary data to be processed 314 is similar to the binary data represented by the previously generated hash value.

In example implementations, the classifier 318 may be configured to classify the binary data 314 using other techniques, such as, for example, calculating an average difference between the values or by comparing statistics calculated over the embedded arrays to reference values.

The devices implementing the byte n-gram embedding model system 302 may each be or include a server or server farm, multiple distributed server farms, a mainframe, a work station, a personal computer (PC), a laptop computer, a tablet computer, a personal digital assistant (PDA), a cellular phone, a media center, an embedded system, or any other sort of device or devices. In one implementation, the devices implementing the byte n-gram embedding model system 302 represent a plurality of computing devices working in communication, such as a cloud computing network of nodes. When implemented on multiple computing devices, the byte n-gram embedding model system 302 may distribute modules and data of the byte n-gram embedding model system 302 among the multiple computing devices. In some implementations, one or more of the devices implementing the byte n-gram embedding model system 302 represent one or more virtual machines implemented on one or more computing devices.

In various embodiments, the network 304 may include any one or more networks, such as wired networks, wireless networks, and combinations of wired and wireless networks. Further, the network 304 may include any one or combination of multiple different types of public or private networks (e.g., cable networks, the Internet, wireless networks, etc.). In some instances, computing devices communicate over the network 304 using a secure protocol (e.g., https) and/or any other protocol or set of protocols, such as the transmission control protocol/Internet protocol (TCP/IP).

In various embodiments, the memory 312 may be volatile (such as RAM), non-volatile (such as ROM, flash memory, etc.) or some combination of the two. Furthermore, memory 312 may include removable storage and/or non-removable storage. The various components and modules stored in the memory 312 may include, for example, methods, threads, processes, applications or any other sort of executable instructions, such as the instructions utilized to perform operations of the byte n-gram embedding model system 302 in conjunction with other devices of the byte n-gram embedding model system 302 (in examples in which the byte n-gram embedding model system 302 includes multiple devices). The various components and modules stored in the memory 312 may also include files and databases.

The byte n-gram embedding model system 302 may also include additional data storage devices (removable and/or non-removable) such as, for example, magnetic disks, optical disks, or tape. Non-transitory computer-readable media may include volatile and nonvolatile, removable and non-removable media implemented in any method or technology for storage of information. The memory 312 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical, tangible medium which can be used to store the desired information and which can be accessed by the byte n-gram embedding model system 302. Any such non-transitory computer-readable media may be part of the byte n-gram embedding model system 302.

Illustrative Generation of File Signatures Using a Byte N-Gram Embedding Model

The byte n-gram embedding model described herein may also support an automatic signature generator 324. A comparison between file signatures may be used to identify files that have similar markers as the file signature, even though the hash values of the files may not suggest a high degree of similarity. In an example implementation, automatic signature generator 324 selects the unique n-grams represented in the generated hash 322, and combines them to form a signature of the binary data. To support signature generation, the hash may be generated based on the entire file, resulting in a strong signature, or the hash may be generated based on a sampling of byte n-grams from the file (e.g., using a pseudo-random sampler), resulting in a weaker signature. While a strong signature may more accurately represent a particular file, a weaker signature may be useful for identifying other files that are similar. For example, a signature that is based on a hash generated from a sampling of byte n-grams from the file is faster to extract and may be more stable to changes due to recompilation of binaries and content addition/removal attacks.

In an example implementation, signature generator 324 is configured to generate a standard Yara signature, which is a widely adopted standard in the security industry. Other known signature generation techniques may also be used. Example code for generation of a Yara signature is given as:

```
Generate yara
8da23bb4262f8451b3e8acdcee2a757
ba1bc2acd46ece1beb1bde51dfa93
{
    strings:
        $ = {0000E879}
        $ = {00013FA9}
        $ = {0001EB1C}
        $ = {000BAA04}
        $ = {000C1465}
        $ = {00111111}
        $ = {00D81B01}
        $ = {00E80EFD}
        $ = {00E82201}
    condition:
        all of them
}
```

Example Processes

FIGS. 4-7 illustrate example processes for determining and using a byte n-gram embedding model. These processes are illustrated as logical flow graphs, each operation of which represents a sequence of operations that can be implemented in hardware, software, or a combination thereof. In the context of software, the operations represent computer-executable instructions stored on one or more tangible, non-transitory computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
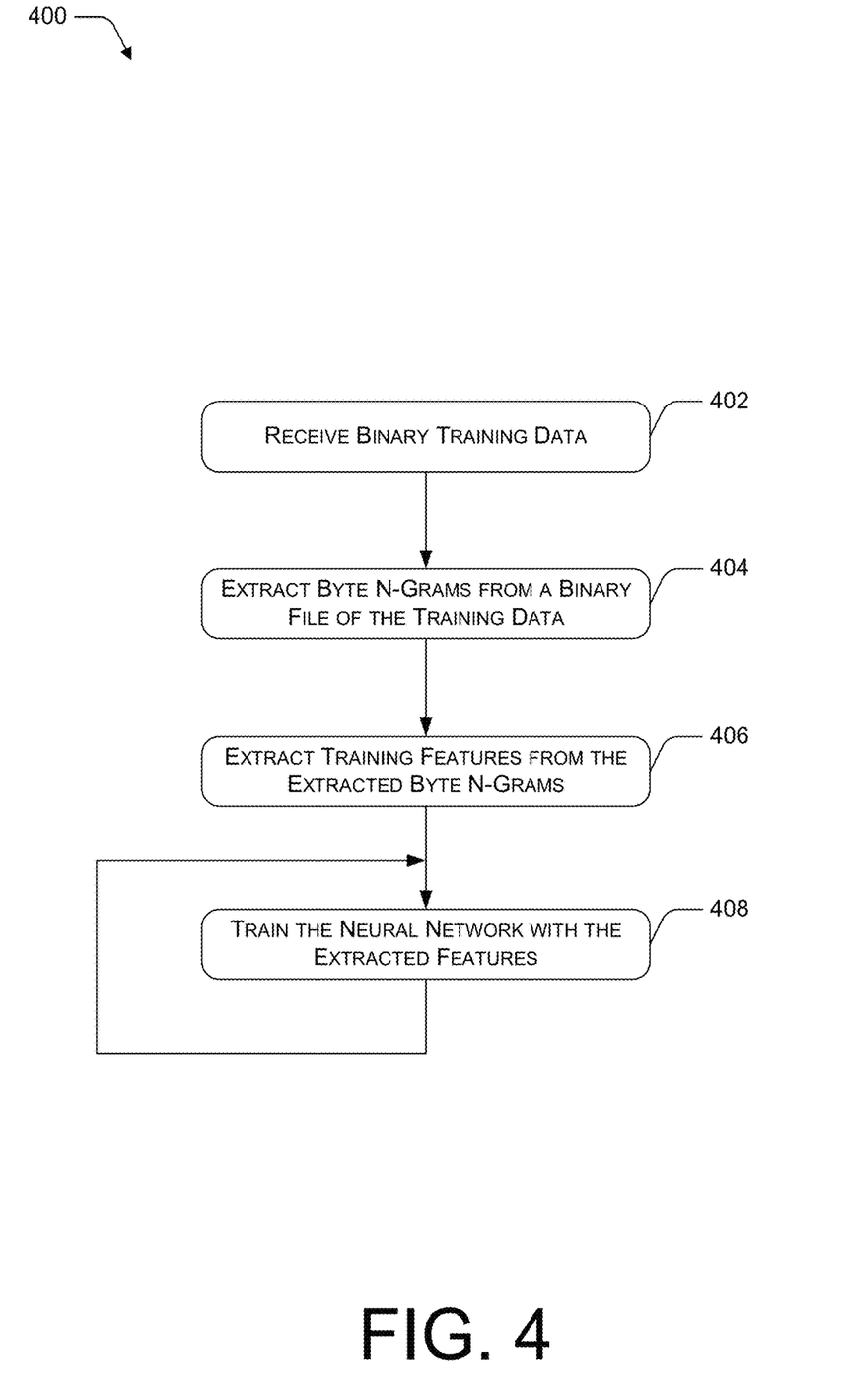
FIG. 4 is a flow diagram illustrating an example process for training a neural network to function as a byte n-gram embedding model.

FIG. 4 illustrates an example process 400 for training a neural network to function as a byte n-gram embedding model.

At block 402, binary training data is received. For example, byte n-gram embedding model system 302 accesses a training database 108 of binary files 110. Examples are discussed herein, for example, with reference to FIG. 1.

At block 404, for a particular binary file in the training data, byte n-grams are extracted from the file. For example, as discussed above with reference to FIG. 1, feature extractor 112 extracts a plurality of byte n-grams 114 from a particular binary file 110. In one example, each byte n-gram consists of four bytes.

At block 406, for each extracted byte n-gram, training features are extracted. As discussed above with reference to FIG. 1, feature extractor 112 may extract byte n-gram features 116 from the byte n-grams 114. For example, as discussed above with reference to FIG. 1 and FIG. 2, feature extractor 112 extracts two nibbles from each byte. So, for a byte 4-gram, eight nibbles are extracted as training features 116.

At block 408, the neural network is trained with the extracted features. For example, regressor 106 executes one iteration of neural network training.

The regressor 106 continues to train the neural network using the extracted features until the neural network is sufficiently trained, as indicated by output from the neural network that is consistent with the training data. For example, training continues until the neural network outputs, for input byte n-grams, values representing natural occurrence probabilities that are within a threshold accuracy of a known probability of occurrence within the training data.

Figure 5:
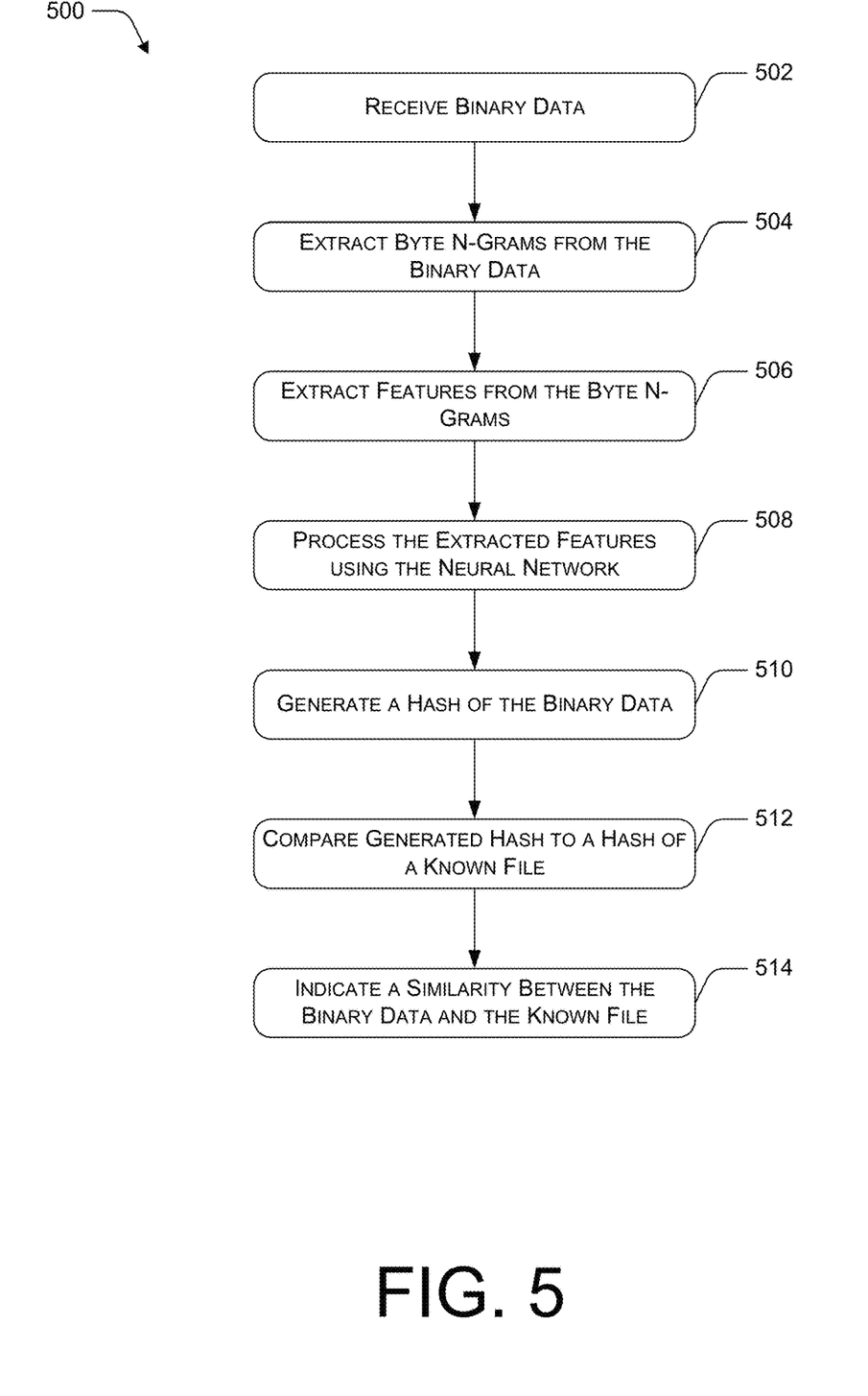
FIG. 5 is a flow diagram illustrating an example process for using a byte n-gram embedding model to determine a similarity between binary data and a known file.

FIG. 5 illustrates an example process 500 for using a byte n-gram embedding model to determine a similarity between received binary data and a known file.

At block 502, binary data is received. For example, binary data to be processed 314 is received from a binary data source 306, via a network 304. As discussed above, the binary data to be processed 314 may include a complete binary file, or may be, for example, a portion of a file that is being downloaded, but has not yet been downloaded in its entirety.

At block 504, byte n-grams are extracted from the received binary data. For example, feature extractor 112 processes the binary data 314 and extracts a plurality of byte n-grams 114.

At block 506, features are extracted from the byte n-grams. For example, feature extractor 112 extracts from the plurality of byte n-grams 114, features 116 to be used as input to the neural network 102. In an example implementation, feature extractor 112 extracts eight nibbles from each byte 4-gram.

At block 508, the extracted features are processed by the neural network. For example, the neural network 102 outputs, for each byte n-gram 114 in the binary data 314, an embedding array 120.

At block 510, a hash of the binary data is generated based on the output from the neural network. For example, hash generator 316 analyzes the output from the neural network and determines, for each position in the arrays of values, a numerical minimum value and a numerical maximum value, and the byte n-gram responsible for each determined minimum value and maximum value. The hash generator 316 generates a hash 322 by concatenating the byte n-grams responsible for the determined minimum values and maximum values for each position in the arrays of values output from the neural network.

At block 512, the generated hash is compared to a known hash. For example, classifier 318 compares the generated hash 322 to a previously generated hash for a known malicious file (or for a known clean file), which may be stored, for example, in hash library 320. For example, as discussed above with reference to FIG. 3, a dot product may be calculated between the embedding arrays associated with the byte n-grams in the generated hash 322 and embedding arrays associated with the byte n-grams in a previously generated hash value stored in the hash library 320, resulting in a similarity score between zero and one, where a larger similarity score represents greater similarity between the files.

At block 514, a similarity between the binary data and the known file is indicated. For example, the similarity score may be displayed or otherwise output.

Figure 6:
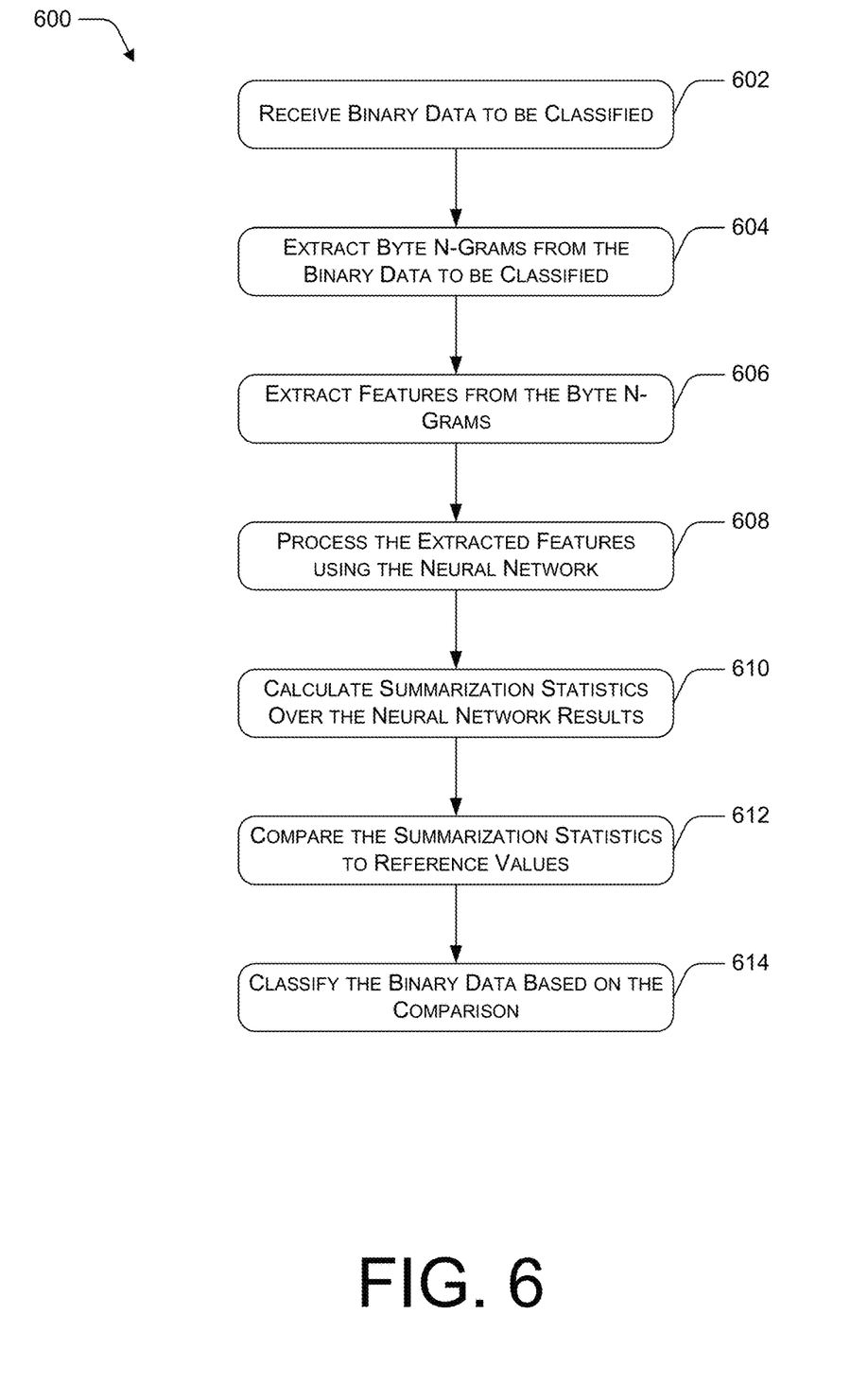
FIG. 6 is a flow diagram illustrating an example process for classifying binary data using a byte n-gram embedding model.

FIG. 6 illustrates an example process 600 for using a byte n-gram embedding model to classify received binary data.

At block 602, binary data to be classified is received. For example, binary data to be processed 314 is received from a binary data source 306, via a network 304. As discussed above, the binary data to be processed 314 may include a complete binary file, or may be, for example, a portion of a file that is being downloaded, but has not yet been downloaded in its entirety.

At block 604, byte n-grams are extracted from the binary data to be classified. For example, feature extractor 112 processes the binary data to be classified 314 and extracts a plurality of byte n-grams 114.

At block 606, features are extracted from the byte n-grams. For example, feature extractor 112 extracts from the plurality of byte n-grams 114, features 116 to be used as input to the neural network 102. In an example implementation, feature extractor 112 extracts eight nibbles from each byte 4-gram.

At block 608, the extracted features are processed by the neural network. For example, the neural network 102 outputs, for each byte n-gram 114 in the binary data to be classified 314, an embedding array 120.

At block 610, summarization statistics are calculated over the neural network results. For example, classifier 318 calculates any number of summarization statistics over the embedding arrays 120 output by the neural network. These summarization statistics may include, for example, average, standard deviation, skew, kurtosis, and so on.

At block 612, the calculated summarization statistics are compared to reference values. For example, classifier 318 compares the summarization statistics that were calculated over the embedding arrays 120 to previously determined reference values. As an example, the reference values may be based on summarization statistics previously calculated over embedding arrays generated for files of known classifications (e.g., clean, malware, adware, and so on).

At block 614, the received binary data is classified based on the comparison described above with reference to block 612. For example, based on the comparison of summarization statistics associated with the received binary data to previously defined reference values, the classifier 318 may classify the received binary data as being clean, malware, adware, or any number of other classes.

Figure 7:
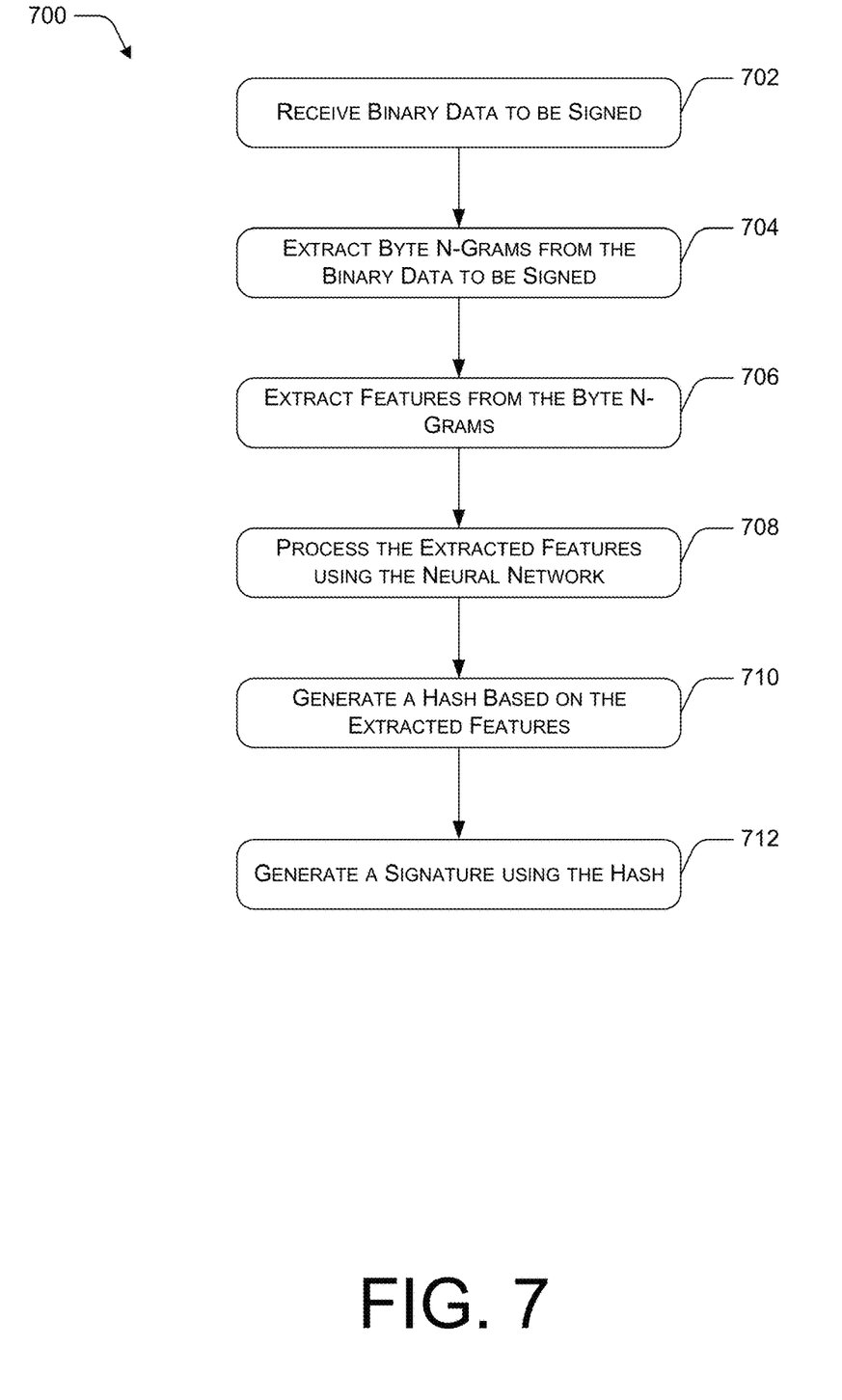
FIG. 7 is a flow diagram illustrating an example process for generating a signature for a binary file using a byte n-gram embedding model.

FIG. 7 illustrates an example process 700 for generating a signature for a binary file using a byte n-gram embedding model.

At block 702, binary data to be signed is received. For example, binary data to be processed 314 is received from a binary data source 306, via a network 304.

At block 704, byte n-grams are extracted from the binary data to be signed. For example, feature extractor 112 processes the binary data 314 and extracts a plurality of byte n-grams. In an example, implementation, signature generator 324 may be configured to direct feature extractor 112 to extract a subset of byte n-grams from the binary data 314 based, for example on a pseudo-number generator, resulting in a pseudo-random sampling of byte n-grams from the binary data. In alternative examples, all of the byte n-grams may be extracted from the binary data.

At block 706, features are extracted from the byte n-grams. For example, feature extractor 112 extracts from the plurality of byte n-grams identified as described with reference to block 704, features to be used as input to the neural network. In an example implementation, feature extractor 112 extracts eight nibbles from each byte 4-gram.

At block 708, the extracted features are processed by the neural network. For example, the neural network outputs, for each byte n-gram extracted from the binary data, an embedding array 120 of values.

At block 710, a hash is generated based on the output from the neural network. For example, hash generator 316 analyzes the output from the neural network and determines, for each position in the arrays of values, a numerically minimum value and a numerically maximum value, and the byte n-gram responsible for each determined minimum value and maximum value. The hash generator 316 generates a hash by concatenating the byte n-grams responsible for the determined minimum values and maximum values for each position in the arrays of values output from the neural network.

At block 712, a signature is generated using the hash. For example, the signature generator 324 generates a standard Yara signature based on the hash generated according to block 710. In alternative examples, other signature generation techniques may be used to generate a signature based on the hash.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   extracting a plurality of byte n-grams from a training set of data;
   using the plurality of byte n-grams extracted from the training set of data to train a neural network to determine a probability of occurrence of any byte n-gram, wherein the neural network comprises at least one embedding model layer;
   receiving data to be processed;
   extracting a plurality of byte n-grams from the data to be processed comprising using a pseudo-random number generator to identify the plurality of byte n-grams in the data to be processed;
   after training the neural network, using the neural network to process the data to be processed based, at least in part, on the plurality of byte n-grams extracted from the data to be processed, wherein processing the data to be processed comprises at least one of:
  generating a hash of the data to be processed based at least in part on the plurality of byte n-grams;
  comparing the data to be processed to a file having a known classification;
  classifying the data to be processed into one of a plurality of predefined classes; and
  generating a signature of the data to be processed, using the hash and based at least in part on a classification.

2. The method as recited in claim 1, wherein using the plurality of byte n-grams extracted from the training set of data to train the neural network comprises:
  extracting features from individual byte n-grams of the plurality of byte n-grams extracted from the training set of data; and
  training the neural network based on the extracted features.

3. The method as recited in claim 2, wherein:
  the byte n-grams comprise byte 4-grams; and
  the features comprise a plurality of 4-bit nibbles.

4. The method as recited in claim 1, wherein the data to be processed comprises one or more of:
  a complete binary file;
  a complete text file;
  a portion of a binary file that is currently being downloaded; or
  network traffic.

5. The method as recited in claim 1, wherein the embedding model layer of the neural network is configured to output an array of values.

6. The method as recited in claim 5, wherein generating a hash of the data to be processed comprises:
  analyzing a plurality of arrays of values output by the embedding model layer to determine, for each array position, a maximum value and a minimum value across the plurality of arrays; and
  for each array position, determining a first byte n-gram that resulted in the maximum value and determining a second byte n-gram that resulted in the minimum value; and
  combining the first byte n-gram and the second byte n-gram for each array position to generate the hash of the data to be processed.

7. The method as recited in claim 5, wherein the array of values comprises an array of 64 values.

8. The method as recited in claim 5, wherein classifying the data to be processed into one of the plurality of predefined classes comprises:
  calculating one or more summarization statistics over the arrays of values output by the embedding model layer of the neural network for the plurality of byte n-grams extracted from the data to be processed;
  comparing the summarization statistics to one or more reference values; and
  classifying the data to be processed based on the comparing.

9. The method as recited in claim 1, wherein comparing the data to be processed to a file having a known classification comprises:
  comparing the hash of the data to be processed to a hash of the file having the known classification to determine a similarity score that indicates a degree of similarity between the hash of the data to be processed and the hash of the file having the known classification.

10. The method as recited in claim 9, wherein comparing the hash of the data to be processed to a hash of the file having the known classification comprises calculating a dot product of embedding arrays associated with byte n-grams in the hash of the data to be processed and embedding arrays associated with byte n-grams in the hash of the file having the known classification.

11. The method as recited in claim 1, further comprising:
  using the hash to generate a Yara signature.

12. One or more non-transitory computer-readable media storing instructions that, when executed by a processor, cause a computing device to perform operations comprising:
  extracting a plurality of byte n-grams from a training set of data;
  using the plurality of byte n-grams to train a neural network to determine a probability of occurrence of any byte n-gram, wherein the neural network comprises at least one embedding model layer configured to output an array of values;
  after training the neural network, receiving data to be processed; and
  using the neural network to process the received data, wherein processing the received data comprises one or more of:
    extracting a subset of byte n-grams in the received data using a pseudo-random number generator;
    generating a first hash of the received data;
    generating a second hash of the received data based at least in part on the subset of byte n-grams;
    classifying the received data; or
    generating a signature of the received data, using the first hash or the second hash and based at least in part on a classification.

13. A system comprising:
  a processor;
  a memory communicatively coupled to the processor;
  a feature extractor stored in the memory and executable by the processor, the feature extractor configured to:
    extract a plurality of byte n-grams from data to be processed;
    extract one or more features from individual byte n-grams of the plurality of byte n-grams;
  a neural network stored in the memory and executable by the processor, the neural network configured to receive the one or more features of a byte n-gram as input, and in response, to output from an embedding model layer of the neural network, an array of values that is calculated based on the one or more features of the byte n-gram; and
  a classifier module stored in the memory and executable by the processor, the classifier module configured to classify the data to be processed based at least in part on the arrays of values, including:
    calculating one or more summarization statistics over the arrays of values output by the embedding model layer of the neural network for the plurality of byte n-grams,
    comparing the summarization statistics to one or more reference values, and
    classifying the data to be processed based on the comparing.

14. The system as recited in claim 13, further comprising:
  a hash generator stored in the memory and executable by the processor, the hash generator configured to generate a hash of the data to be processed based on the arrays of values output from the embedding model layer of the neural network.

15. The system as recited in claim 14, wherein the hash generator is configured to:
  for each position in an array structure corresponding to the output from the embedding model layer of the neural network, select one or more byte n-grams from the plurality of byte n-grams extracted from the data to be processed; and
  combine the selected one or more byte n-grams according to a predetermined order to generate the hash of the data to be processed.

16. The system as recited in claim 15, wherein the hash generator is further configured to:
  for each position in the array structure corresponding to the output from the embedding model layer of the neural network:
    select a first byte n-gram that resulted in a minimum value in the position in the array; and
    select a second byte n-gram that resulted in a maximum value in the position in the array.

17. The system as recited in claim 13, wherein the classifier module is further configured to compare the data to be processed to a file having a known classification, including:
  compare a hash of the data to be processed to a hash of the file having the known classification to determine a similarity score that indicates a degree of similarity between the hash of the data to be processed and the hash of the file having the known classification.

18. The system as recited in claim 17, wherein the classifier module is further configured to calculate a dot product of embedding arrays associated with byte n-grams in the hash of the data to be processed and embedding arrays associated with byte n-grams in the hash of the file having the known classification.

19. The system as recited in claim 13, further comprising a signature generator module stored in the memory and executable by the processor to generate a Yara signature of the data to be processed.

* * * * *